US012719162B2

(12) United States Patent
Liu et al.

(10) Patent No.: US 12,719,162 B2
(45) Date of Patent: Aug. 25, 2026

(54) PHASED ARRAY ANTENNA, SCANNING METHOD THEREFOR, AND ANTENNA SYSTEM

(71) Applicants: Beijing BOE Technology Development Co., Ltd., Beijing (CN); BOE Technology Group Co., Ltd., Beijing (CN)

(72) Inventors: Zongmin Liu, Beijing (CN); Feng Qu, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 329 days.

(21) Appl. No.: 18/271,852

(22) PCT Filed: Dec. 17, 2021

(86) PCT No.: PCT/CN2021/139246
§ 371 (c)(1),
(2) Date: Jul. 12, 2023

(87) PCT Pub. No.: WO2023/108626
PCT Pub. Date: Jun. 22, 2023

(65) Prior Publication Data
US 2024/0063537 A1 Feb. 22, 2024

(51) Int. Cl.
*H01Q 3/00* (2006.01)
*H01Q 3/26* (2006.01)
(Continued)

(52) U.S. Cl.
CPC ............... *H01Q 3/267* (2013.01); *H01Q 3/36* (2013.01); *H01Q 3/30* (2013.01); *H01Q 3/38* (2013.01)

(58) Field of Classification Search
CPC ............ H01Q 3/267; H01Q 3/44; H01Q 3/36; H01Q 3/38; H01Q 3/30
(Continued)

(56) References Cited

U.S. PATENT DOCUMENTS 10,972,172 B2 4/2021 Krunz et al.
11,122,479 B2 9/2021 Kalkunte
(Continued)

FOREIGN PATENT DOCUMENTS

CN 111612121 A 9/2020
CN 112821061 A * 5/2021 ............... H04B 1/38
(Continued)

OTHER PUBLICATIONS

International Search Report for PCT/CN2021/139246 Mailed Sep. 8, 2022.

*Primary Examiner* — Chuong P Nguyen

(57) ABSTRACT

A phased array antenna, a scanning method therefor, and an antenna system. The phased array antenna comprises a plurality of antenna elements and a liquid crystal phase shifter used for performing phase calibration on the plurality of antenna elements. The scanning method comprises: applying a first wave control voltage to the liquid crystal phase shifter, and detecting first received signal level values received by the plurality of antenna elements; and continuously adjusting the first wave control voltage by means of an artificial intelligence algorithm, and detecting second received signal level values received by the plurality of antenna elements, until the ratios of the first received signal level values to the second received signal level values are greater than or equal to a first threshold.

19 Claims, 5 Drawing Sheets

(51) Int. Cl.
*H01Q 3/36* (2006.01)
*H01Q 3/30* (2006.01)
*H01Q 3/38* (2006.01)

(58) Field of Classification Search
USPC .................................................. 342/372, 371
See application file for complete search history.

(56) References Cited

U.S. PATENT DOCUMENTS

| | | | | |
|---|---|---|---|---|
| 11,156,859 | B2 * | 10/2021 | Liu | H01Q 1/38 |
| 11,862,863 | B2 * | 1/2024 | Salman | H04B 17/12 |
| 12,046,833 | B2 * | 7/2024 | Zeng | H01Q 3/44 |
| 12,095,170 | B2 * | 9/2024 | Guo | H01Q 3/267 |
| 2006/0237537 | A1 | 10/2006 | Empedocles et al. | |
| 2015/0009069 | A1 * | 1/2015 | Yun | H04B 7/18515<br>342/368 |
| 2019/0348761 | A1 * | 11/2019 | Miehle | H01Q 3/36 |
| 2021/0208430 | A1 | 7/2021 | Liu et al. | |
| 2022/0278451 | A1 | 9/2022 | Zeng et al. | |
| 2022/0311129 | A1 | 9/2022 | Li et al. | |

FOREIGN PATENT DOCUMENTS

| | | | | | |
|---|---|---|---|---|---|
| CN | 112909552 | A | * | 6/2021 | H01Q 3/30 |
| CN | 111060859 | B | | 7/2021 | |
| CN | 117477229 | A | * | 1/2024 | H01Q 3/30 |
| CN | 119518296 | A | * | 2/2025 | G06F 17/16 |
| JP | 2019023703 | A | | 2/2019 | |
| WO | 2021164430 | A1 | | 8/2021 | |
| WO | WO-2022005554 | A1 | * | 1/2022 | G02B 5/32 |

* cited by examiner

PHASED ARRAY ANTENNA, SCANNING METHOD THEREFOR, AND ANTENNA SYSTEM

CROSS-REFERENCE TO RELATED APPLICATION

The present application is a U.S. National Phase Entry of International Application No. PCT/CN2021/139246 having an international filing date of Dec. 17, 2021, the entire content of which is hereby incorporated by reference.

TECHNICAL FIELD

The present disclosure relates to, but is not limited to, the technical field of communication, in particular to a phased array antenna, a scanning method therefor and an antenna system.

BACKGROUND

Nearly 80% of the land and 95% of the ocean by area in the earth are areas that are hard or difficult to be covered by terrestrial networks. According to a survey conducted by the Global System for Mobile Communications (GSMA for short), at present, more than 30% of the global population has no mobile communication services, and about 52% of the population has no broadband services. Many satellite network systems, including China's Guowang, US' Starlink and Russia's Sfera, are actively promoting satellite Internet technologies. The last 10% of users on the earth can access to the Internet by using space-ground integration network technologies and satellite communication technologies.

Corresponding to a broad prospect of a satellite market, satellite ground terminal devices are also developing rapidly. Low-cost liquid crystal phased array antennas are expected to replace traditional servo antenna systems and high-cost Transmitter and Receiver (TR for short) component antenna systems, and become a solution for popularizing satellite communication ground terminals.

SUMMARY

The following is a summary of subject matters described herein in detail. The summary is not intended to limit the protection scope of claims.

A phased array antenna is provided in an embodiment of the present disclosure. The phased array antenna includes a plurality of antenna array elements and a liquid crystal phase shifter used for phase calibration of the plurality of antenna array elements. The scanning method includes the following acts: applying a first beam steering voltage to the liquid crystal phase shifter, detecting a level value of a first received signal received by the plurality of antenna array elements; continuously adjusting the first beam steering voltage by an artificial intelligence algorithm and detecting level values of a second received signal received by the plurality of antenna array elements, until a ratio of the level value of the first received signal to a level value of the second received signal is greater than or equal to a first threshold value.

In some exemplary implementations, the method further includes:

dividing a region to be scanned of the phase array antenna into a plurality of first sub-regions, adjusting the beam steering voltage for the liquid crystal phase shifter to detect level values of a third received signal received in the plurality of first sub-regions, and determining a first sub-region corresponding to a maximum level value of the third received signal;

dividing the first sub-region corresponding to the maximum level value of the third received signal into a plurality of second sub-regions, adjusting the beam steering voltage for the liquid crystal phase shifter to detect level values of a fourth received signal received in the plurality of second sub-regions; when a ratio of the maximum level value of the third received signal to a maximum level value of the fourth received signal is less than a second threshold value, updating the maximum level value of the fourth received signal to the maximum level value of the third received signal, and updating a second sub-region corresponding to the maximum level value of the fourth received signal to the first sub-region corresponding to the maximum level value of the third received signal, and triggering an operation of dividing the first sub-region corresponding to the maximum level value of the third received signal into a plurality of second sub-regions, until the ratio of the maximum level value of the third received signal to the maximum level value of the fourth received signal is greater than or equal to the second threshold value.

In some exemplary implementations, the scanning method further includes: dividing the region to be scanned of the phase array antenna into the plurality of first sub-regions includes: uniformly dividing the region to be scanned of the phase array antenna into the plurality of the first sub-regions in a vertical direction;

dividing the first sub-region corresponding to the maximum level value of the third received signal into the plurality of second sub-regions specifically includes uniformly dividing the region to be scanned of the phased array antenna into the plurality of first sub-regions in the vertical direction.

In some exemplary implementations, the scanning method further includes that the second threshold ranges from 0.631 to 0.841.

In some exemplary implementations, the scanning method further includes that the first threshold ranges from 0.841 to 0.944.

In some exemplary implementations, the scanning method further includes that the artificial intelligence algorithm is a genetic algorithm or a particle swarm optimization algorithm.

In some exemplary implementations, the scanning method further includes that the first received signal is a pilot signal and the second received signal is a pilot signal.

In some exemplary implementations, the method further includes:

calculating a rough azimuth of a satellite according to position information and attitude information of the phased array antenna and pre-installed satellite ephemeris information, and receiving a satellite broadcast ephemeris according to the calculated rough azimuth of the satellite;

when the satellite broadcast ephemeris is received, calculating an accurate orientation of the satellite according to the received satellite broadcast ephemeris; and when no satellite broadcast ephemeris is received, recording a current beam steering voltage as the first beam steering voltage, recording a level value of a current received signal as the level value of the first received signal, and triggering an operation of continuously adjusting the first beam steering voltage by the artificial intelligence algorithm.

In some exemplary implementations, calculating the rough azimuth of the satellite according to the position information and the attitude information of the phased array antenna and the pre-installed satellite ephemeris information, and receiving the satellite broadcast ephemeris according to the calculated rough azimuth of the satellite, includes:

acquiring the position information and the attitude information of the phased array antenna;

calculating the rough azimuth of the satellite according to the acquired position information, the attitude information and the pre-installed satellite ephemeris information;

calculating azimuth angle and pitch angle information of the phased array antenna and the satellite according to the calculated rough azimuth of the satellite; and performing satellite capturing and satellite broadcast ephemeris receiving according to the calculated azimuth angle and pitch angle information as well as a preset antenna scanning angle and beam steering voltage look-up table.

In some exemplary implementations, when a connection between the phased array antenna and a satellite is interrupted, the scanning method further includes:

recording a level value of a received signal before the connection is interrupted as a level value of a fifth received signal, and recording a level value of a current received signal as a level value of a sixth received signal;

when a ratio of the level value of the sixth received signal to the level value of the fifth received signal is less than a third threshold value, adjusting a beam direction of the phased array antenna according to inertial navigation acceleration information, and recording the adjusted beam steering voltage as the first beam steering voltage, and triggering an operation of continuously adjusting the first beam steering voltage by the artificial intelligence algorithm.

In some exemplary implementations, the third threshold is ranges from 0.707 to 0.891.

In some exemplary implementations, adjusting the beam direction of the phased array antenna according to the inertial navigation acceleration information, includes:

performing time integration on the inertial navigation acceleration, and transforming an integration result to a navigation coordinate system to get angle information;

calculating a correction angle of the phased array antenna according to the angle information, and converting the correction angle into a normal deflection angle; and adjusting the beam direction of the phased array antenna according to the normal deflection angle, a preset antenna scanning angle and beam steering voltage look-up table.

In some exemplary implementations, the fifth received signal is a pilot signal or a data signal, and the sixth received signal is a pilot signal or a data signal.

A phased array antenna is also provided in an embodiment of the present disclosure, which includes a plurality of antenna array elements and a liquid crystal phase shifter used for phase calibration of the plurality of antenna array elements. The phased array antenna performs scanning according to the scanning method described in the above-mentioned implementations.

In some exemplary implementations, the liquid crystal phase shifter includes any one or more of a microstrip transmission line, a coplanar waveguide transmission line, and a periodically variable capacitor.

An antenna system is also provided in an embodiment of the present disclosure. The antenna system includes a baseband system, an antenna feed system and a beam steering system, wherein the baseband system is configured to perform baseband processing on a signal; the antenna feed system is configured to transmit and receive satellite signals; the antenna feed system includes a phased array antenna, a combiner, a power divider, a downconverter and an upconverter, wherein the phased array antenna includes a plurality of antenna array elements and a liquid crystal phase shifter for performing phase calibration on the plurality of antenna array elements, the combiner is connected with the downconverter, and the power divider is connected with the upconverter; the beam steering system is configured to drive and control the liquid crystal phase shifter, the beam steering system includes a central control module, a voltage loading module, an inertial navigation module, a positioning module and an attitude detection module; wherein the central control module is configured to receive data of the inertial navigation module, the positioning module and the attitude detection module and calculate a beam steering voltage needed by the liquid crystal phase shifter to control the phased array antenna to perform scanning according to the scanning method in any one of the above-mentioned implementations; the voltage loading module is configured to output a corresponding beam steering voltage to the liquid crystal phase shifter according to a calculation result of the central control module.

In some exemplary implementations, the voltage loading module includes a multiplexing switch, a positive polarity amplification module, a negative polarity amplification module, a positive polarity digital-to-analog conversion module, a negative polarity digital-to-analog conversion module, and a shift register; wherein the multiplexing switch is connected with the positive polarity amplification module, the negative polarity amplification module and the liquid crystal phase shifter, respectively; the positive polarity digital-to-analog conversion module is connected with the positive polarity amplification module and the shift register, respectively; the negative polarity digital-to-analog conversion module is connected with the negative polarity amplification module and the shift register, respectively; and the shift register is connected with the central control module.

In some exemplary implementations, the baseband system includes a pattern matching module, a stream matching module, a modulation and demodulation module, and a coding and decoding module, wherein the pattern matching module is configured to split different data streams into data areas to form baseband frame data; the stream matching module is configured to perform timing management, data filling, and scrambling and descrambling processing on the baseband frame data; the modulation and demodulation module is configured to modulate or demodulate the baseband frame data; and the coding and decoding module is configured to encode or decode the baseband frame data.

Other aspects may be understood upon reading and understanding the drawings and detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure, but do not constitute limitations on the technical solutions of the present disclosure. Shapes and sizes of one or more components in the drawings do not reflect true scales, but are only intended to schematically describe contents of the present disclosure.

DETAILED DESCRIPTION

Figure 1:
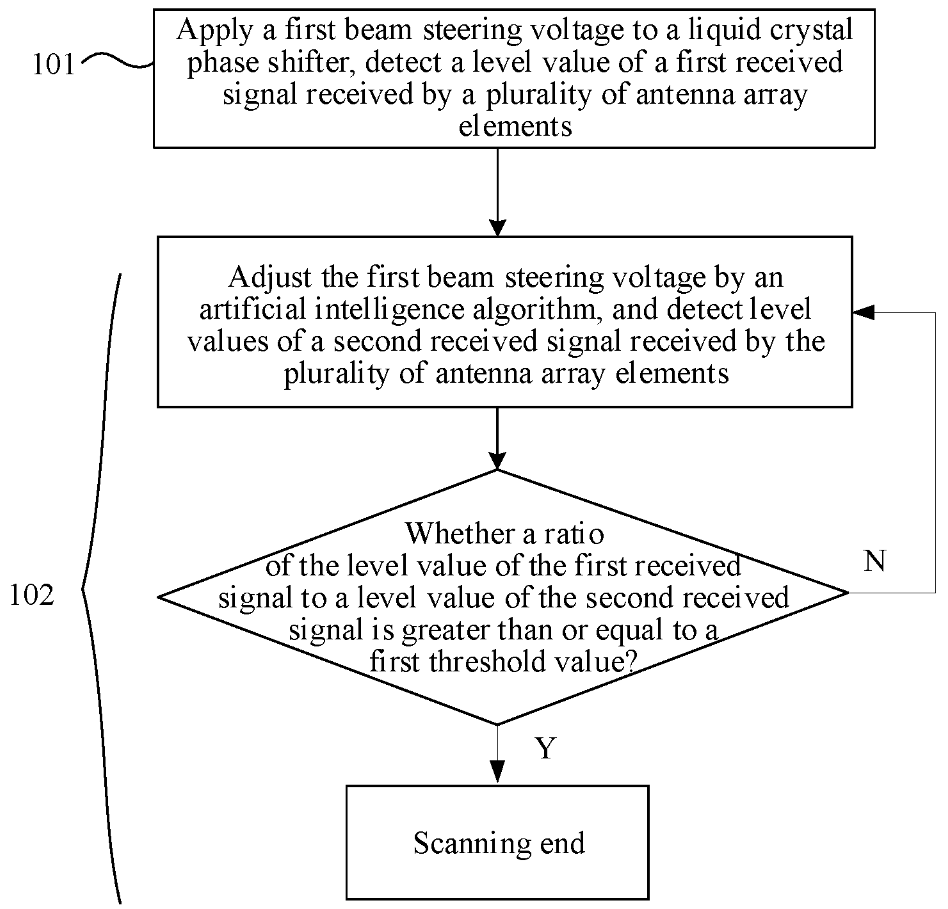
FIG. 1 is a flow chart of a scanning method for a phased array antenna according to an exemplary embodiment of the present disclosure.

Embodiments of the present disclosure will be described below in combination with drawings in detail. Implementations may be implemented in a plurality of different forms. Those of ordinary skills in the art may easily understand such a fact that implementations and contents may be transformed into one or more forms without departing from the purpose and scope of the present disclosure. Therefore, the present disclosure should not be explained as being limited to contents described in following implementations only. The embodiments in the present disclosure and features in the embodiments may be combined randomly with each other without conflict.

In the drawings, a size of one or more constituent elements, a thickness of a layer, or a region is sometimes exaggerated for clarity. Therefore, one implementation of the present disclosure is not necessarily limited to the dimensions, and shapes and sizes of multiple components in the accompanying drawings do not reflect actual scales. In addition, the drawings schematically illustrate ideal examples, and one mode of the present disclosure is not limited to shapes, numerical values, or the like shown in the drawings.

Ordinal numerals such as "first", "second" and "third" in the present disclosure are set to avoid confusion of constituent elements, but not intended for restriction in quantity. "Multiple" in the present disclosure means a quantity of two or more.

In the present disclosure, for convenience, wordings "central", "up", "down", "front", "back", "vertical", "horizontal", "top", "bottom", "inside", "outside" and the like indicating orientation or positional relationships are used to illustrate positional relationships between constituent elements with reference to the drawings, which are only to facilitate describing the present specification and simplify the description, rather than indicating or implying that involved devices or elements must have specific orientations and be structured and operated in the specific orientations, and thus should not be understood as limitations on the present disclosure. The positional relationships between the constituent elements are changed as appropriate based on directions for describing the constituent elements. Therefore, appropriate replacements may be made according to situations without being limited to the wordings described in the specification.

In the present disclosure, unless otherwise specified and defined, terms "mounting", "mutual connection" and "connection" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the present disclosure, "electric connection" includes a case where constituent elements are connected through an element with a certain electrical effect. The "element with a certain electrical effect" is not particularly limited as long as electrical signals may be sent and received between the connected constituent elements. Examples of "an element with a certain electrical effect" not only include electrodes and wirings, but also include switching elements such as transistors, resistors, inductors, capacitors, other elements with one or more functions, etc.

In the present disclosure, "parallel" refers to a state in which an angle formed by two straight lines is −10° or more and 10° or less, and thus may include a state in which the angle is −5° or more and 5° or less. In addition, "perpendicular" refers to a state in which an angle formed by two straight lines is 80° or more and 100° or less, and thus may include a state in which the angle is 85° or more and 95° or less.

In the present disclosure, "about" and "substantially" refer to that a boundary is not defined strictly and a case within a range of a process and measurement error is allowed.

A phased array antenna refers to an antenna that changes the pattern shape by controlling the feeding phase of the radiating element in the array antenna. By controlling the phase, a direction of the maximum value of the antenna pattern can be changed to achieve the purpose of receiving signals. Liquid crystal phased array antenna is a kind of phased array antenna which uses liquid crystal deflection to achieve phase control, and a great attention has been paid on the liquid crystal phased array antenna in the art of display apparatus.

A scanning method for a phased array antenna is provided in an embodiment of the present disclosure, wherein the phased array antenna includes a plurality of antenna array elements and a liquid crystal phase shifter for performing phase calibration on the plurality of antenna array elements, as shown in FIG. 1, the scanning method includes acts 101 to 102.

In act 101, a first beam steering voltage is applied to the liquid crystal phase shifter, and a level value of a first received signal received by the plurality of antenna array elements is detected.

In act 102, the first beam steering voltage is continuously adjusted by an artificial intelligence algorithm and level values of a second received signal received by the plurality of antenna array elements are detected, until a ratio of the level value of the first received signal to a level value of the second received signal is greater than or equal to a first threshold value.

According to the scanning method for the phased array antenna provided in an embodiment of the present disclosure, by continuously adjusting the first beam steering voltage by the artificial intelligence algorithm, the artificial intelligence algorithm is combined with an antenna scanning method to automatically and quickly adjust a scanning angle to an optimal angle, thereby not only achieving intelligent scanning, but also improving a scanning speed and accuracy of the antenna.

In some exemplary embodiments, the first threshold value ranges from 0.841 to 0.944. That is, a difference between a power value of a received signal before adjustment and a power value of the received signal after adjustment is ensured to be between 0.5 dB and 1.5 dB.

Optionally, the first threshold value may be 0.891.

In this embodiment, the scanning angle of the antenna is fine-tuned with the artificial intelligence algorithm. Generally, the beam direction during fine-tuning is needed to meet bandwidth accuracy of 1 dB, that is, the difference between the power of the received signal before adjustment and the power of the received signal after adjustment is ensured to be less than 1 dB. According to a relationship between the signal power and the signal level, a ratio of the level value of the received signal before adjustment to the level value of the received signal after adjustment is ensured to be greater than or equal to 0.891, that is, the first threshold value can be 0.891.

In some exemplary embodiments the artificial intelligence algorithm may be a Genetic Algorithm (GA for short) or a Particle Swarm optimization (PSO for short) algorithm.

The genetic algorithm described in the present disclosure is a computational model for simulating a biological evolution process of natural selection and genetic mechanism of Darwin's biological evolution theory, and is a method for searching an optimal solution by simulating a natural evolution process. The genetic algorithm takes all individuals in a population as objects, and uses randomization technology to guide an efficient search of a coded parameter space.

The particle swarm optimization algorithm is a random search algorithm based on group cooperation, which is developed by simulating foraging behaviors of birds.

In some exemplary embodiments, the received signals (including the first received signal, the second received signal, and a third received signal to a sixth received signal described later) in an embodiment of the present disclosure may be pilot signals.

In this embodiment, satellite signals include a data signal and a pilot signal, and the pilot signal refers to a signal transmitted for a purpose of measuring or monitoring. Generally, a power of the pilot signal is larger than a power of the data signal, and a modulation mode of the pilot signal is simple, and the pilot signal is relatively easy to be decoded.

In some exemplary embodiments, the scanning method further includes the following contents.

A region to be scanned of the phase array antenna is divided into a plurality of first sub-regions, the beam steering voltage for the liquid crystal phase shifter is adjusted to detect level values of a third received signal received in the plurality of first sub-regions, and a first sub-region corresponding to a maximum level value of the third received signal is determined.

The first sub-region corresponding to the maximum level value of the third received signal is divided into a plurality of second sub-regions, the beam steering voltage for the liquid crystal phase shifter is adjusted to detect level values of a fourth received signal received in the plurality of second sub-regions. When a ratio of the maximum level value of the third received signal to a maximum level value of the fourth received signal is less than a second threshold value, the maximum level value of the fourth received signal is updated to the maximum level value of the third received signal, and a second sub-region corresponding to the maximum level value of the fourth received signal is updated to the first sub-region corresponding to the maximum level value of the third received signal, and an operation of dividing the first sub-region corresponding to the maximum level value of the third received signal into the plurality of second sub-regions is triggered, until the ratio of the maximum level value of the third received signal to the maximum level value of the fourth received signal is greater than or equal to the second threshold value.

According to the scanning method in an embodiment of the present invention, by dividing the region to be scanned of the phase array antenna into the plurality of first sub-regions, then dividing the first sub-region corresponding to the maximum level value of the received signal into the plurality of second sub-regions, and dividing the second sub-regions in turn until the level value of the received signal meets a preset threshold condition, a region selected of the first sub-region is continuously refined, thus a fast scanning method based on a space region is achieved without any priori information. Because the liquid crystal phased array antenna is an active phase scanning antenna, switching between beams in different directions are only in sub-milliseconds. The beams before and after switching are independent of each other, thus ensuring the effective implementation of the scanning method.

In some exemplary embodiments, the region to be scanned of the phase array antenna may be divided into N1 first sub-regions, wherein N1 may be a natural number greater than or equal to 2. Optionally, N1 is greater than or equal to 4.

In some exemplary embodiments, the first sub-region corresponding to the maximum level value of the third received signal is divided into N2 second sub-regions, wherein N2 may be a natural number greater than or equal to 2. Optionally, N2 is greater than or equal to 4. N2 and N1 may be equal or not equal, which is not limited in the present disclosure.

In some exemplary embodiments, dividing the region to be scanned of the phase array antenna into the plurality of first sub-regions specifically includes uniformly dividing the region to be scanned of the phase array antenna into the plurality of first sub-regions in a vertical direction.

In some exemplary embodiments, dividing the first sub-region corresponding to the maximum level value of the third received signal into the plurality of second sub-regions specifically includes uniformly dividing the region to be scanned of the phase array antenna into a plurality of first sub-regions in the vertical direction.

In this embodiment, a dividing method for the first sub-region and a dividing method for the second sub-region may be the same or different. For example, in order to reduce the complexity, a same dividing method may be selected for the first sub-region and the second sub-region.

In some exemplary embodiments, the second threshold value ranges from 0.631 to 0.841. That is, a difference between a power value of a received signal before adjustment and a power value of the received signal after adjustment is ensured to be between 1.5 dB and 4 dB.

For example, the second threshold value may be 0.707.

In this embodiment, when initial scanning is performed on the phased array antenna, the beam direction is generally needed to meet the bandwidth accuracy of 3 dB. According to the relationship between the signal power and the signal level, the ratio of the level value of the received signal before adjustment to the level value of the received signal after adjustment is ensured to be greater than or equal to 0.707. That is, the second threshold value may be 0.707.

Figure 2:
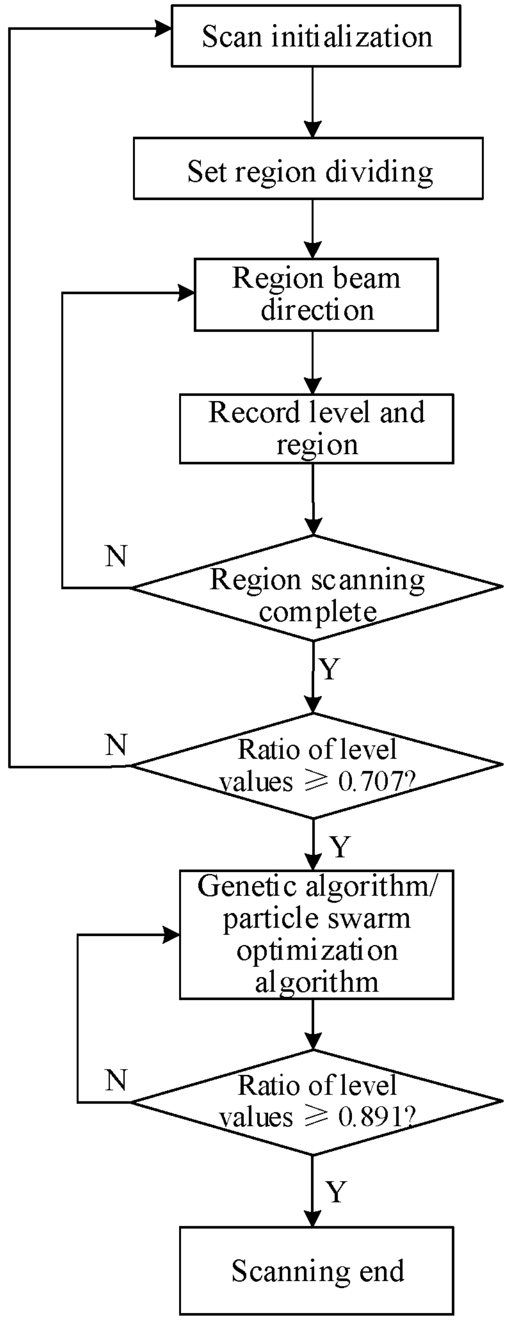
FIG. 2 is another flow chart of a scanning method for a phased array antenna according to an exemplary embodiment of the present disclosure.

In some exemplary embodiments, as shown in FIG. 2, a scanning method for an antenna is provided in embodiments of the present disclosure, which includes the following acts 1 to 5.

In act 1, a region to be scanned is divided into N1 (N1≥4) first sub-regions within a whole antenna viewing angle (scanning range), and N1 groups of initial beam steering voltages are set according to a relationship between beam steering voltages and beam directions, so as to ensure that the beams corresponding to each group of initial beam steering voltages all direct to a divided first sub-region.

In act 2, after an antenna system is powered on, the N1 first sub-regions are scanned one by one according to the set N1 groups of initial beam steering voltages. When a first one of the N1 first sub-regions is scanned, an amplitude level value $V_1$ of a detected pilot signal and a region serial number 1 are recorded. When a second one of the N1 first sub-regions is scanned, an amplitude level value $V_2$ of the detected pilot signal is recorded, and $V_2$ and $V_1$ are compared. If $V_2>V_1$, $V_1$ is replaced with $V_2$, and the region serial number is recorded as 2. Otherwise, $V_1$ and the region serial number 1 are remained, and so on, until all of the N1 first sub-regions are scanned to obtain a maximum amplitude level value $V_N$ of the pilot signal and the region serial number N corresponding to a corresponding first sub-region which are recorded.

In act 3, the first sub-region corresponding to the region serial number N is divided into N2 second sub-regions, and N2 groups of beam steering voltages are set, so as to ensure that the beams corresponding to each group of beam steering voltages all direct to a divided second sub-region. A second sub-region N' with a maximum amplitude level value of the detected pilot signal is found according to the aforementioned method, and a new maximum level value $V_{N'}$ is recorded.

In act 4, $V_N$ and $V_{N'}$ are compared. If $V_N/V_{N'}<0.707$, a second sub-region N' with a maximum amplitude level value of the detected pilot signal is updated to the first sub-region corresponding to the region serial number N, and the act 3 is repeated, until a ratio of the maximum amplitude level value $V_N$ to the new maximum level value $V_{N'}$ is greater than or equal to 0.707 (i.e., a difference between the power values is less than 3 dB).

In act 5, based on a drive voltage $V_{Ni'}$ in the act 4, a phase shift in each channel is fine-tuned (a corresponding drive voltage is obtained according to a voltage-phase shift curve of the liquid crystal phase shifter), and an artificial intelligence algorithm such as the genetic algorithm or the particle swarm optimization algorithm can be used for fine-tuning, until the ratio of the two level values is greater than or equal to 0.891 (that is, a difference between the power values is less than 1 dB).

In some exemplary embodiments, the scanning method further includes the following contents.

A rough azimuth of a satellite is calculated according to position information and attitude information of the phased array antenna and pre-installed satellite ephemeris information, and a satellite broadcast ephemeris is received according to the calculated rough azimuth of the satellite.

When the satellite broadcast ephemeris is received, an accurate orientation of the satellite is calculated according to the received satellite broadcast ephemeris.

When no satellite broadcast ephemeris is received, a current beam steering voltage is recorded as the first beam steering voltage, a level value of a current received signal is recorded as a level value of the first received signal, and an operation of continuously adjusting the first beam steering voltage by the artificial intelligence algorithm is triggered.

Although the beam direction of liquid crystal phased array antenna is only related to the drive voltage, which ensures the timeliness of the fast scanning method based on a spatial region, "blind scanning" still takes up a certain start-up time after all. Therefore, another achievable satellite-seeking strategy based on the liquid crystal phased array antenna is also provided in an embodiment of the present disclosure, namely a program-controlled scanning method based on a satellite ephemeris. The satellite ephemeris is an expression used to describe a position and a velocity of a space flying object, also known as Two-Line Orbital Element (TLE for short). Main parameters include a satellite serial number, an orbital eccentricity, a reference time, an orbital inclination, a right ascension rate of ascending node, a square root of an orbital long half axis, a right ascension of ascending node, a perigee depression angle, a mean anomaly, a clock correction parameter, etc. The time, position and velocity of satellites and flying objects can be calculated, predicted, described and tracked accurately. The way to use the satellite ephemeris to calculate position, velocity and the like is not illustrated in details in embodiments of the present disclosure.

In some exemplary embodiments, calculating the rough azimuth of the satellite according to the position information and the attitude information of the phased array antenna and the pre-installed satellite ephemeris information, and receiving the satellite broadcast ephemeris according to the calculated rough azimuth of the satellite, includes:

- acquiring the position information and the attitude information of the phased array antenna (for example, the position information of the phased array antenna can be acquired according to a GPS positioning module, and the attitude information of the phased array antenna can be acquired according to a gyroscope module);
- calculating the rough azimuth of the satellite according to the acquired position information, the attitude information and the pre-installed satellite ephemeris information;
- calculating azimuth angle and pitch angle information of the phased array antenna and the satellite according to the calculated rough azimuth of the satellite; and
- performing satellite capturing and satellite broadcast ephemeris receiving according to the calculated azimuth angle and pitch angle information as well as a preset antenna scanning angle and beam steering voltage look-up table.

Figure 3:
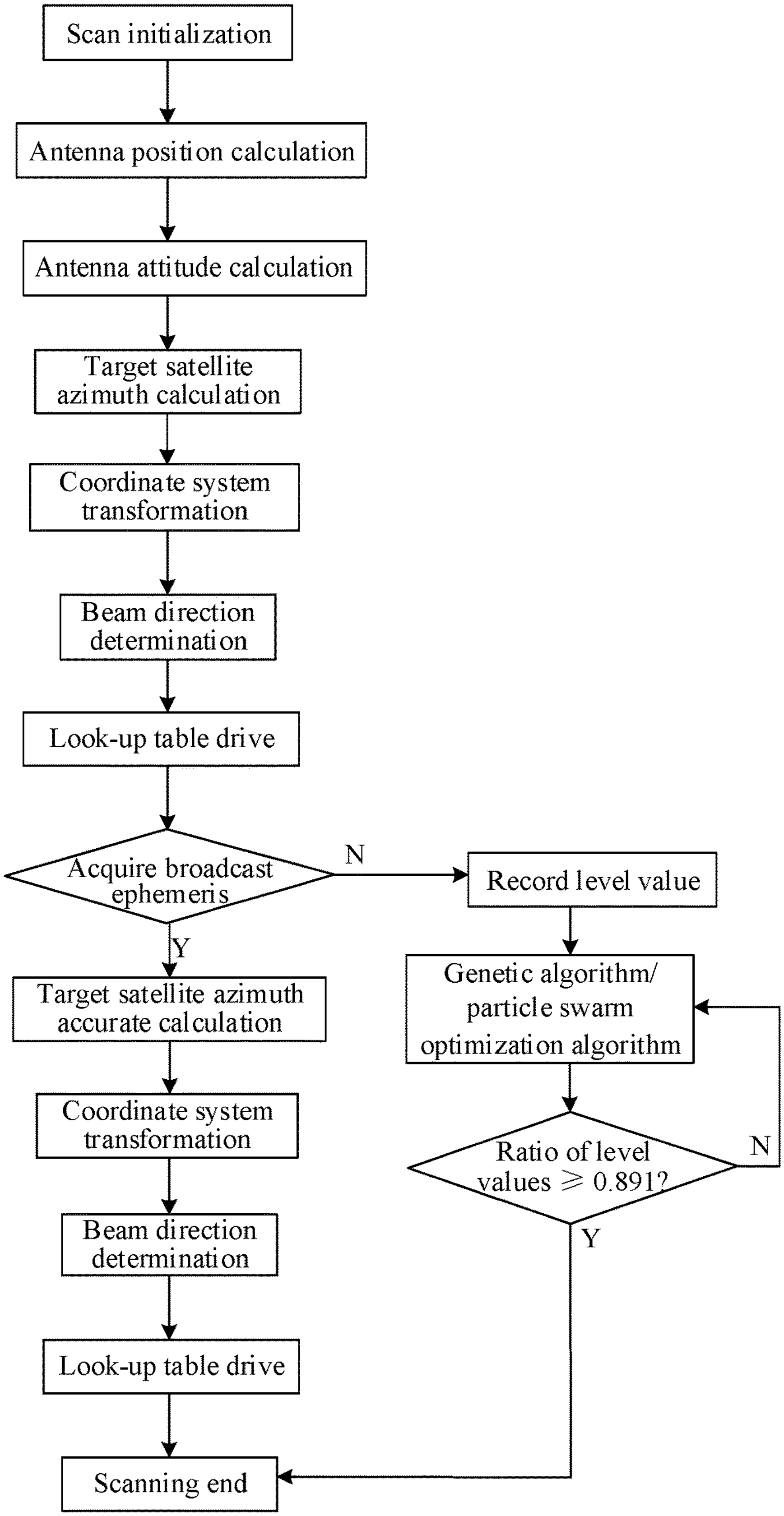
FIG. 3 is another flow chart of a scanning method for a phased array antenna according to an exemplary embodiment of the present disclosure.

In some exemplary embodiments, as shown in FIG. 3, a scanning method for an antenna is provided in embodiments of the present disclosure, which includes the following acts 1 to 7.

In act 1, position information of a liquid crystal phased array antenna is obtained by a GPS positioning module.

In act 2, attitude information of the liquid crystal phased array antenna is obtained by a gyroscope module.

In act 3, according to essential orbital parameters provided by a pre-installed ephemeris of the liquid crystal phased array antenna, low-precision satellite azimuth information is quickly calculated in a baseband system.

In act 4, the position information, the attitude information and the azimuth information in acts 1 to 3 are transformed into a coordinate system to obtain azimuth angle and pitch angle information of the antenna and the satellite.

In act 5, fast satellite capturing is performed according to a scanning angle and beam steering voltage look-up table of a liquid crystal phase shifter and the azimuth angle and pitch angle information obtained in act 4.

In act 6, a satellite broadcast ephemeris of a low bit rate is received, a precise position of the satellite is calculated in the baseband system, and acts 4 to 5 are repeated to obtain a maximum amplitude level value $V_{max}$ after precise directing.

In act 7, If the satellite broadcast ephemeris is not received, based on the beam steering voltage in act 5, the phase shift in each channel is fine-tuned (a corresponding beam steering voltage is obtained according to a beam steering voltage and phase shift curve of the liquid crystal phase shifter), and an artificial intelligence algorithm based on the genetic algorithm or the particle swarm optimization algorithm can be used for fine-tuning, until the ratio of the two level values is greater than or equal to 0.891 (that is, a difference between the power values is less than 1 dB).

The two scanning methods aforementioned (the fast scanning method based on the space region and the program-controlled scanning method based on the satellite ephemeris) are aimed at initial satellite-seeking and achieve initial connection establishment. When the established information connection is interrupted due to reasons such as tunnel signal obstruction and large-angle steering, the phased array antenna needs to be able to quickly align with the satellite and recover the connection. At this time, an inertial navigation module can be used to correct the azimuth, and then the adaptive algorithm can be used to accurately align.

In some exemplary embodiments, when the connection between the phased array antenna and the satellite is interrupted, the scanning method further includes the following contents.

A level value of a received signal before the connection is interrupted is recorded as a level value of a fifth received signal, and a level value of a current received signal is recorded as a level value of a sixth received signal.

When a ratio of the level value of the sixth received signal to the level value of the fifth received signal is less than a third threshold value, the beam direction of the phased array antenna is adjusted according to inertial navigation acceleration information, and the adjusted beam steering voltage is recorded as the first beam steering voltage, the operation of continuously adjusting the first beam steering voltage by the artificial intelligence algorithm is triggered.

In this embodiment, since a stable connection is established in advance, the fifth received signal and the sixth received signal can be pilot signals or data signals. Optionally for simplicity, both the fifth received signal and the sixth received signal are pilot signals.

In some exemplary embodiments, the third threshold is between 0.707 and 0.891, that is, a power value difference between the sixth received signal and the fifth received signal is less than 1 dB to 3 dB.

For example, the third threshold may be 0.891 (i.e. the power value difference is less than 1 dB).

In some exemplary embodiments, adjusting the beam direction of the phased array antenna according to the acceleration information of the inertial navigation module, includes:

performing time integration on the inertial navigation acceleration, and transforming an integration result to a navigation coordinate system to get angle information;

calculating a correction angle of the phased array antenna according to the angle information, and converting the correction angle into a normal deflection angle; and adjusting the beam direction of the phased array antenna according to the normal deflection angle, the preset antenna scanning angle and beam steering voltage look-up table.

Figure 4:
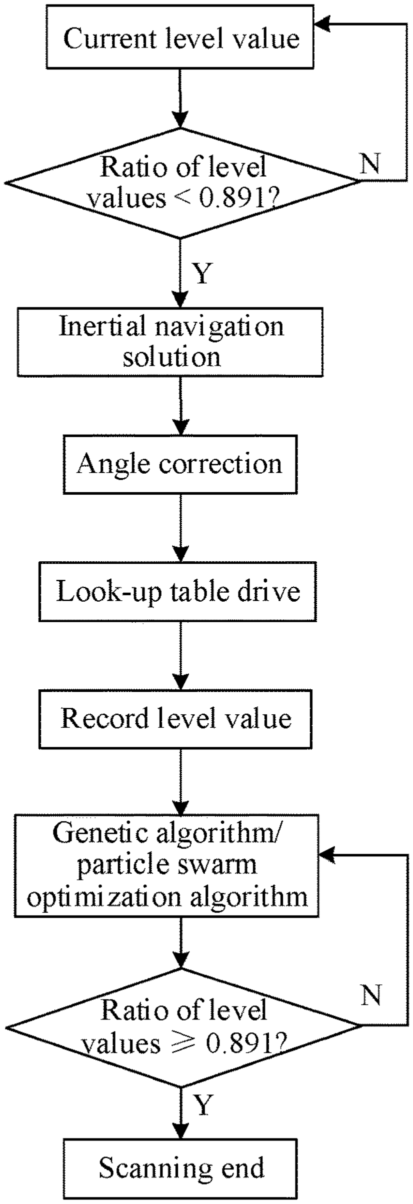
FIG. 4 is another flow chart of a scanning method for a phased array antenna according to an exemplary embodiment of the present disclosure.

As shown in FIG. 4, an embodiment of the present disclosure also provides an adaptive scanning method for inertial navigation, which includes the following acts 1 to 6.

In act 1, a signal level value $V_s$ for establishing a stable connection is recorded.

In act 2, a relationship between a current signal level value $V_t$ and $V_s$ is determined, if $V_t/V_s<0.891$, acceleration information of the inertial navigation module is recorded.

In act 3, time integration is performed on acceleration, and an integration result is transformed to a navigation coordinate system to get angle information.

In act 4, according to the angle information, a correction angle of the liquid crystal phased array antenna is inversely calculated and converted to a normal deflection angle.

In act 5, according to a scanning angle and beam steering voltage look-up table of a liquid crystal phase shifter, a beam direction is adjusted and a level value $V_r$ is recorded.

In act 6, based on the drive voltage $V_r$ in the act 5, a phase shift in each channel is fine-tuned (a corresponding drive voltage is obtained according to a voltage and phase shift curve of the liquid crystal phase shifter), and an artificial intelligence algorithm such as the genetic algorithm or the particle swarm optimization algorithm can be used for fine-tuning, until the ratio of the two level values is greater than or equal to 0.891 (that is, a difference between the power values is less than 1 dB).

According to the antenna scanning method provided in the embodiments of the present disclosure, the inertial navigation module is provided, changes in the position and azimuth of the antenna can be recorded in time, so that the antenna can quickly make a correction response, avoiding satellite losing and recapturing.

A phased array antenna is also provided in an embodiment of the present disclosure, which includes a plurality of antenna array elements and a liquid crystal phase shifter used for phase calibration of the plurality of antenna array elements. The phased array antenna performs scanning according to the scanning method described in the above-mentioned embodiments.

Figure 5:
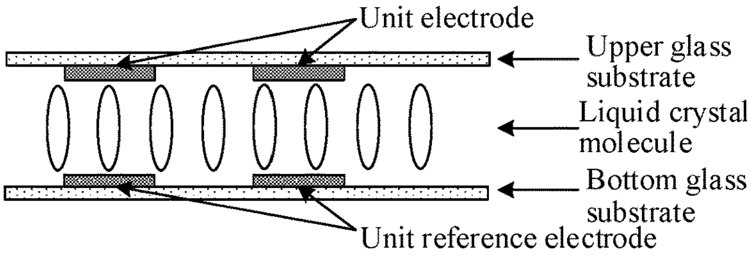
FIG. 5 is a schematic diagram of a structure of a liquid crystal phase shifter according to an exemplary embodiment of the present disclosure.

In the liquid crystal phased array antenna, a liquid crystal phase shifter fabricated based on an adjustable liquid crystal dielectric constant is used as a phase shifting unit, thereby the liquid crystal phase shifter has the advantages of low cost, low polishing surface and easy conformal. A typical structure of the liquid crystal phase shifter is shown in FIG. 5. The dominant technical schemes of liquid crystal phase shifters include a microstrip transmission line, a coplanar waveguide transmission line, a periodically variable capacitor, etc. The nature of phase shifting is to form an electric field by loading a drive voltage. Liquid crystal molecules are turned over by electric field force, resulting in change in the dielectric constant, and then changing a transmission speed of electromagnetic waves, resulting in a phase difference under a condition of transmission lines with the same length.

An antenna system is also provided in an embodiment of the present disclosure, which includes a baseband system, an antenna feed system and a beam steering system.

The baseband system is configured to perform baseband processing on a signal.

The antenna feed system is configured to transmit and receive satellite signals. The antenna feed system includes a phased array antenna, a combiner, a power divider, a down-converter and an upconverter, wherein the phased array antenna includes a plurality of antenna array elements and a liquid crystal phase shifter for performing phase calibration on the plurality of antenna array elements, the combiner is connected with the downconverter, and the power divider is connected with the upconverter.

The beam steering system is configured to drive and control the liquid crystal phase shifter. The beam steering system includes a central control module, an inertial navigation module, a positioning module and an attitude detection module. The central control module controls the phased array antenna to perform scanning according to a scanning method in any of the above-mentioned embodiments.

Figure 6:
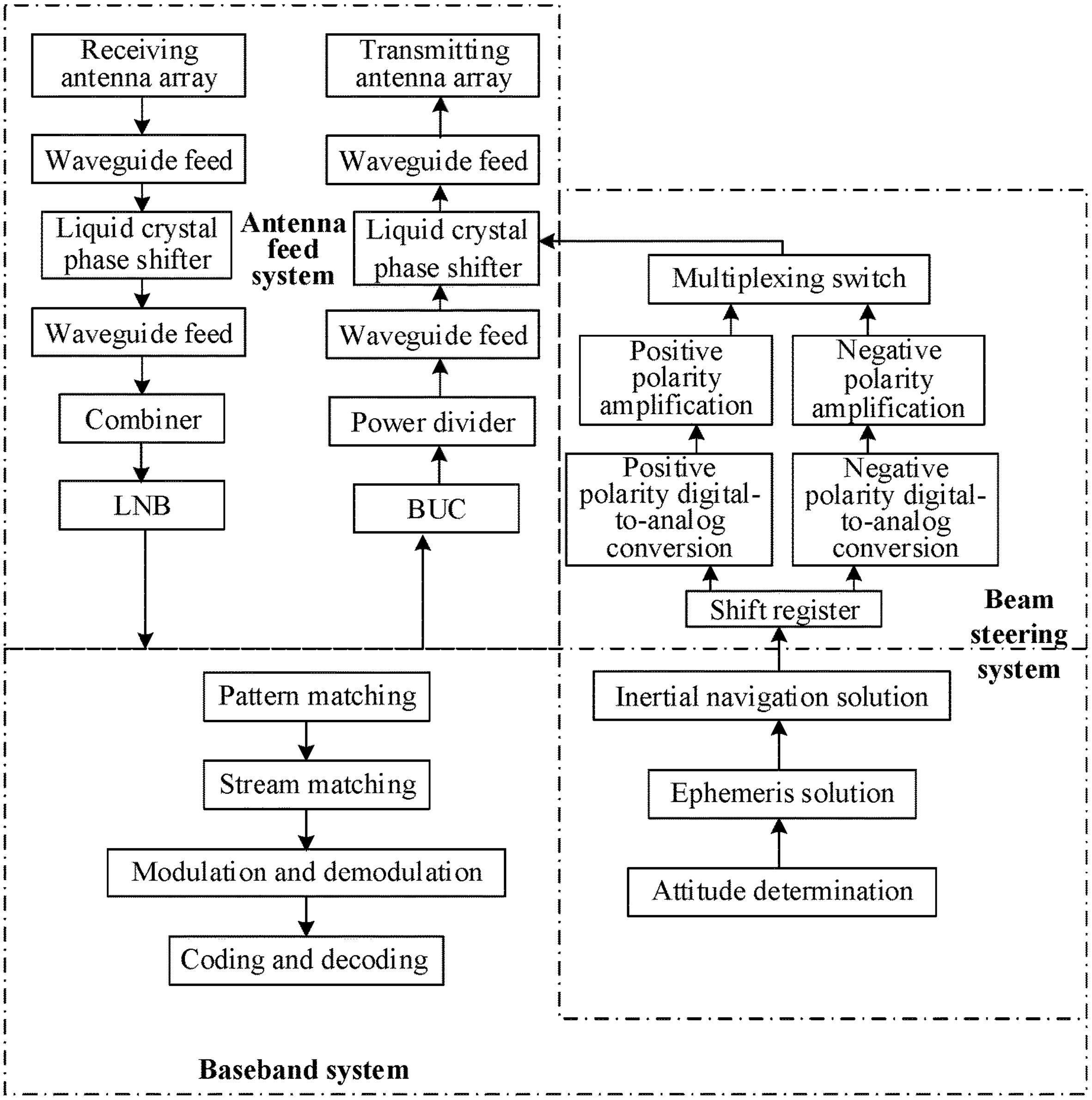
FIG. 6 is a schematic diagram of a structure of an antenna system according to an exemplary embodiment of the present disclosure.

In an embodiment of the present disclosure, as shown in FIG. 6, the antenna system mainly includes an antenna feed system, a beam steering system and a digital baseband system. The antenna feed system is responsible for transmitting and receiving electromagnetic waves in the satellite communication frequency band, feeding in and feeding out of guided waves, and signal preprocessing. The antenna feed system is mainly composed of a radome, a transceiver antenna array, a slot coupling structure, a liquid crystal phase shifter, a cushion foam (due to a glass-based liquid crystal phase shifter, foam is used for cushion and fixation, so as to avoid unevenness and uneven stress), a microstrip-to-waveguide structure, a waveguide power divider/combiner, a waveguide-coaxial conversion structure (a waveguide is converted into an RF coaxial connector structure, and an RF coaxial cable can be used for subsequent transmission), an RF connector, an RF cable, a Low Noise Block (LNB for short) and a Block Up Converter (BUC for short). The beam steering system is responsible for driving the liquid crystal phase shifter to achieve beam direction control. The beam steering system is mainly composed of an inertial navigation module, a positioning module, an attitude detection module, a central control module (the central control module may be a processor that decides a drive voltage application strategy according to a look-up table and information input by the inertial navigation module) and a voltage loading module. The voltage loading module may be a Liquid Crystal Display (LCD for short) drive chip. A multiplexing switch, a positive polarity amplification, a negative polarity amplification, a positive polarity digital-to-analog conversion, a negative polarity digital-to-analog conversion and shift register in FIG. 6 are a block diagram of an internal circuit of the LCD drive chip. The digital baseband system is responsible for signal mode adaptation, coding and decoding, modulation and demodulation, etc. The digital baseband system is mainly composed of an Analog-to-digital-to-analog (ADA for short) converter, a Field Programmable Gate Array (FPGA for short), a Digital Signal Processor (DSP for short) and an Advanced RISC Machine (ARM for short) microprocessor. The overall system block diagram is shown in FIG. 6 (FIG. 6 only reflects a main framework, but the details are not reflected). An inertial navigation solution module, an ephemeris solution module and an attitude determination module in FIG. 6 belong to the beam steering system, all of them need to use processors, but all of them do not belong to the baseband system. The baseband system mainly uses a processor to implement an algorithm. Therefore, although their functions belong to different systems, they may be implemented on one processor chip in hardware implementation. Of course, in some exemplary embodiments, the functions may be separately processed by a plurality of processors, which is not limited in the present disclosure.

In some exemplary implementations, the voltage loading module includes a multiplexing switch, a positive polarity amplification module, a negative polarity amplification module, a positive polarity digital-to-analog conversion module, a negative polarity digital-to-analog conversion module, and a shift register.

The multiplexing switch is connected with the positive polarity amplification module, the negative polarity amplification module and the liquid crystal phase shifter, respectively. The positive polarity digital-to-analog conversion module is connected with the positive polarity amplification module and the shift register, respectively. The negative polarity digital-to-analog conversion module is connected with the negative polarity amplification module and the shift register, respectively. The shift register is connected with the central control module.

A workflow of a liquid crystal phased array antenna system is described as follows. For a receiving link, a receiving antenna array receives a satellite signal in a desired azimuth space, the satellite signal is input to a liquid crystal phase shifter for phase compensation through a feed structure (a drive signal for a phase shifter is directed by a beam determined by an inertial navigation module and a target satellite, and is provided by an LCD drive chip), then enters a combiner through the feed structure for energy superposition. A Low Noise Block performs down-conversion, preliminary amplification and filtering, and outputs an intermediate frequency signal to an analog-to-digital converter for quantization. A series of matching treatments (pattern matching, stream matching, etc.), demodulation and decoding are performed on the quantized digital signal in a baseband processor to be transformed into data information for users. A workflow of a transmitting link is approximately opposite to that of the receiving link. User data is coded, modulated and beam-formed in the baseband at first, converted to an analog intermediate frequency by a digital-to-analog converter, then up-converted and amplified by a block converter, fed into the liquid crystal phase shifter for phase adjustment after passing through a power divider, and finally radiated by a transmitting antenna array in a form of signal.

In the embodiments of the present disclosure, the term "pattern matching" refers to splitting different data streams into data areas. After pattern matching, baseband frame data are formed, wherein the modes mainly include a Normal Mode (NM for short) and a High Efficiency Mode (HEM for short). The term "stream matching" refers to timing management, data filling, scrambling and descrambling of the baseband frame data, wherein the streams mainly include a Transport Stream (TS for short), a Generic Encapsulated Stream (GSE for short), a Generic Continuous Stream (GCS for short), a Generic Fixed-length Packed Stream (GFPS for short) and the like.

In the embodiments of the present disclosure, since a coding mode and a modulation mode of satellite communication systems are relatively simple to those of mobile communication systems, the baseband system can be implemented in various forms, including an FPGA+ARM, an FPGA+DSP, an FPGA+ARM+DSP, an FPGA-integrated Processing System (PS for short), an FPGA-integrated Programmable Logic (PL for short) and the like.

In the embodiments of the present disclosure, a hardware implementation of the beam steering system includes a gyroscope module, a positioning module, an inertial navigation module and a voltage loading module (the voltage loading module includes an LCD drive chip, a peripheral circuit and a wiring). In order to obtain accurate antenna attitude information, a micro-mechanical gyroscope, a ring laser gyroscope and a fiber optic gyroscope can be selected and used as the gyroscope module, the positioning module can obtain antenna position information, and can be a Global Positioning System (GPS for short) positioning module, a Beidou (BD for short) positioning module or a Galileo positioning module. The inertial navigation module mainly uses a current position and gyroscope information to predict a position in future, which can be used for rapid recovery after signal interruption due to occlusion and other reasons. Strapdown inertial navigation modules and gimbaled inertial navigation modules can be used. The voltage loading module drives the liquid crystal phase shifter mainly based on the scanning algorithm to achieve beam control. The liquid crystal phase shifter can be driven by a combination of an analog-to-digital converter and an operational amplifier, or by designing a special purpose chip.

The drawings of the present disclosure only involve structures involved in the present disclosure, and other structures may refer to conventional designs. The embodiments of the present disclosure and features in the embodiments may be combined to each other to obtain new embodiments if there is no conflict.

Those of ordinary skills in the art should understand that modifications or equivalent replacements may be made on the technical solutions of the present disclosure without departing from the spirit and scope of the technical solutions of the present disclosure, and shall all fall within the scope of the claims of the present disclosure.

The invention claimed is:

1. A scanning method for a phased array antenna, wherein the phased array antenna comprises a plurality of antenna array elements and a liquid crystal phase shifter for performing phase calibration on the plurality of antenna array elements, and the scanning method comprises:

applying a first beam steering voltage to the liquid crystal phase shifter, detecting a level value of a first received signal received by the plurality of antenna array elements; and adjusting continuously the first beam steering voltage by an artificial intelligence algorithm and detecting level values of a second received signal received by the plurality of antenna array elements, until a ratio of the level value of the first received signal to a level value of the second received signal is greater than or equal to a first threshold value, wherein the artificial intelligence algorithm is a genetic algorithm or a particle swarm optimization algorithm; and wherein the adjusting continuously the first beam steering voltage by the artificial intelligence algorithm and detecting level values of the second received signal received by the plurality of antenna array elements, until the ratio of the level value of the first received signal to the level value of the second received signal is greater than or equal to the first threshold value comprises:

a scanning angle of the plurality of antenna array elements is fine-tuned with the genetic algorithm or the particle swarm optimization algorithm, a beam direction of the plurality of antenna array elements during the fine-tuning meets bandwidth accuracy of 1 dB, a difference between a power of the first received signal before the fine-tuning and a power of the second received signal after the fine-tuning is less than 1 dB; according to a relationship between a signal power and a signal level, detecting the level values of the second received signal received by the plurality of antenna array elements, until a ratio of the level value of the first received signal before the fine-turning to the level value of the second received signal after the fine-turning is greater than or equal to the first threshold value.

2. The scanning method of claim 1, further comprising:

dividing a region to be scanned of the phase array antenna into a plurality of first sub-regions, adjusting the beam steering voltage for the liquid crystal phase shifter to detect level values of a plurality of third received signals received in the plurality of first sub-regions, and determining a first sub-region corresponding to a maximum level value of a third received signal of the plurality of third received signals;

dividing the first sub-region corresponding to the maximum level value of the third received signal into a plurality of second sub-regions, adjusting the beam steering voltage for the liquid crystal phase shifter to detect level values of a plurality of fourth received signals received in the plurality of second sub-regions; when a ratio of the maximum level value of the third received signal to a maximum level value of a fourth received signal of the plurality of fourth received signals is less than a second threshold value, updating the maximum level value of the fourth received signal to the maximum level value of the third received signal, and updating a second sub-region corresponding to the maximum level value of the fourth received signal to the first sub-region corresponding to the maximum level value of the third received signal, and triggering an operation of dividing the first sub-region corresponding to the maximum level value of the third received signal into the plurality of second sub-regions, until the ratio of the maximum level value of the third received signal to the maximum level value of the fourth received signal is greater than or equal to the second threshold value.

3. The scanning method of claim 2, wherein dividing the region to be scanned of the phase array antenna into the plurality of first sub-regions comprises: dividing uniformly the region to be scanned of the phase array antenna into the plurality of the first sub-regions in a vertical direction;

dividing the first sub-region corresponding to the maximum level value of the third received signal into the plurality of second sub-regions specifically comprises dividing uniformly the region to be scanned of the phased array antenna into the plurality of first sub-regions in the vertical direction.

4. The scanning method of claim 2, wherein the second threshold value ranges from 0.631 to 0.841.

5. The scanning method of claim 1, wherein the first threshold value ranges from 0.841 to 0.944.

6. The scanning method of claim 1, wherein the first received signal is a pilot signal and the second received signal is a pilot signal.

7. The scanning method of claim 1, further comprising:

calculating a rough azimuth of a satellite according to position information and attitude information of the phased array antenna and pre-installed satellite ephemeris information, and receiving a satellite broadcast ephemeris according to the calculated rough azimuth of the satellite;

when the satellite broadcast ephemeris is received, calculating an accurate orientation of the satellite according to the received satellite broadcast ephemeris; and when no satellite broadcast ephemeris is received, recording a current beam steering voltage as the first beam steering voltage, recording a level value of a current received signal as the level value of the first received signal, and triggering an operation of adjusting continuously the first beam steering voltage by the artificial intelligence algorithm.

8. The scanning method of claim 7, wherein calculating the rough azimuth of the satellite according to the position information and the attitude information of the phased array antenna and the pre-installed satellite ephemeris information, and receiving the satellite broadcast ephemeris according to the calculated rough azimuth of the satellite, comprises:

acquiring the position information and the attitude information of the phased array antenna;

calculating the rough azimuth of the satellite according to the acquired position information, the attitude information and the pre-installed satellite ephemeris information;

calculating azimuth angle and pitch angle information of the phased array antenna and the satellite according to the calculated rough azimuth of the satellite; and performing satellite capturing and satellite broadcast ephemeris receiving according to the calculated azimuth angle and pitch angle information as well as a preset antenna scanning angle and beam steering voltage look-up table.

9. The scanning method of claim 1, when a connection between the phased array antenna and a satellite is interrupted, the scanning method further comprises:

recording a level value of a received signal before the connection is interrupted as a level value of a fifth received signal, and recording a level value of a current received signal as a level value of a sixth received signal;

when a ratio of the level value of the sixth received signal to the level value of the fifth received signal is less than a third threshold value, adjusting the beam direction of the phased array antenna according to inertial navigation acceleration information, and recording the adjusted beam steering voltage as the first beam steering voltage, and triggering an operation of adjusting continuously the first beam steering voltage by the artificial intelligence algorithm.

10. The scanning method of claim 9, wherein the third threshold value ranges from 0.707 to 0.891.

11. The scanning method of claim 9, wherein adjusting the beam direction of the phased array antenna according to the inertial navigation acceleration information comprises:

performing time integration on the inertial navigation acceleration, and transforming an integration result to a navigation coordinate system to get angle information;

calculating a correction angle of the phased array antenna according to the angle information, and converting the correction angle into a normal deflection angle; and adjusting the beam direction of the phased array antenna according to the normal deflection angle, a preset antenna scanning angle and beam steering voltage look-up table.

12. The scanning method of claim 9, wherein the fifth received signal is a pilot signal or a data signal, and the sixth received signal is a pilot signal or a data signal.

13. A phased array antenna, wherein the phased array antenna performs scanning according to the scanning method of claim 1, and the phased array antenna comprises the plurality of antenna array elements and a liquid crystal phase shifter used for phase calibration of the plurality of antenna array elements.

14. The phased array antenna of claim 13, wherein the liquid crystal phase shifter comprises any one or more of a microstrip transmission line, a coplanar waveguide transmission line, and a periodically variable capacitor.

15. An antenna system, comprising: a baseband system, an antenna feed system, and a beam steering system, wherein:

the baseband system is configured to perform baseband processing on a signal;

the antenna feed system is configured to transmit and receive satellite signals; the antenna feed system comprises a phased array antenna, a combiner, a power divider, a downconverter and an upconverter, wherein the phased array antenna comprises a plurality of antenna array elements and a liquid crystal phase shifter for performing phase calibration on the plurality of antenna array elements, the combiner is connected with the downconverter, and the power divider is connected with the upconverter;

the beam steering system is configured to drive and control the liquid crystal phase shifter, the beam steering system comprises a central control module, a voltage loading module, an inertial navigation module, a positioning module and an attitude detection module; the central control module is configured to receive data of the inertial navigation module, the positioning module and the attitude detection module and calculate a beam steering voltage needed by the liquid crystal phase shifter to control the phased array antenna to perform scanning according to the scanning method of claim 1; the voltage loading module is configured to output a corresponding beam steering voltage to the liquid crystal phase shifter according to a calculation result of the central control module.

16. The antenna system of claim 15, wherein the voltage loading module comprises a multiplexing switch, a positive polarity amplification module, a negative polarity amplification module, a positive polarity digital-to-analog conversion module, a negative polarity digital-to-analog conversion module, and a shift register;

the multiplexing switch is connected with the positive polarity amplification module, the negative polarity amplification module and the liquid crystal phase shifter, respectively; the positive polarity digital-to-analog conversion module is connected with the positive polarity amplification module and the shift register, respectively; the negative polarity digital-to-analog conversion module is connected with the negative polarity amplification module and the shift register, respectively; and the shift register is connected with the central control module.

17. The antenna system of claim 15, wherein the baseband system comprises a pattern matching module, a stream matching module, a modulation and demodulation module, and a coding and decoding module; wherein the pattern matching module is configured to split different data streams into data areas to form baseband frame data;

the stream matching module is configured to perform timing management, data filling, and scrambling and descrambling processing on the baseband frame data;

the modulation and demodulation module is configured to modulate or demodulate the baseband frame data; and the coding and decoding module is configured to encode or decode the baseband frame data.

18. A phased array antenna, wherein the phased array antenna performs scanning according to the scanning method of claim 2, and the phased array antenna comprises the plurality of antenna array elements and a liquid crystal phase shifter used for phase calibration of the plurality of antenna array elements.

19. A phased array antenna, wherein the phased array antenna performs scanning according to the scanning method of claim 3, and the phased array antenna comprises the plurality of antenna array elements and a liquid crystal phase shifter used for phase calibration of the plurality of antenna array elements.

* * * * *